May 23, 1967 P. W. WOOD 3,321,632

TWO-STATE RADIANT ENERGY ACTUATED CIRCUITS

Filed Nov. 13, 1964

INVENTOR.
Paul W. Wood

BY

Hugh L. Fisher
ATTORNEY

United States Patent Office 3,321,632
Patented May 23, 1967

3,321,632

TWO-STATE RADIANT ENERGY ACTUATED CIRCUITS

Paul W. Wood, Warren, Mich., assignor to General Motors Corporation, Detroit, Mich., a corporation of Delaware Filed Nov. 13, 1964, Ser. No. 410,978
2 Claims. (Cl. 250—209)

This invention relates to improvements in radiant energy responsive circuits particularly adapted, although not exclusively, to perform switching operations.

Mechanical switches; i.e., switches utilizing contacts, have certain inherent disadvantages. Among these are erratic operation due to wear and misalignment of the contacts and the always-present problem of arcing. To avoid these problems and others a new and different contactless switch is proposed.

The invention further contemplates a novel bistable circuit that is actuated by an external light between two stable states, that can provide a memory function, and that incorporates a unique optical feedback arrangement.

The invention also contemplates a switching circuit actuated by an external light between two stable On and Off states; either of which states can be maintained indefinitely once a state has been established by a momentary radiant energy pulse.

Figure 1:
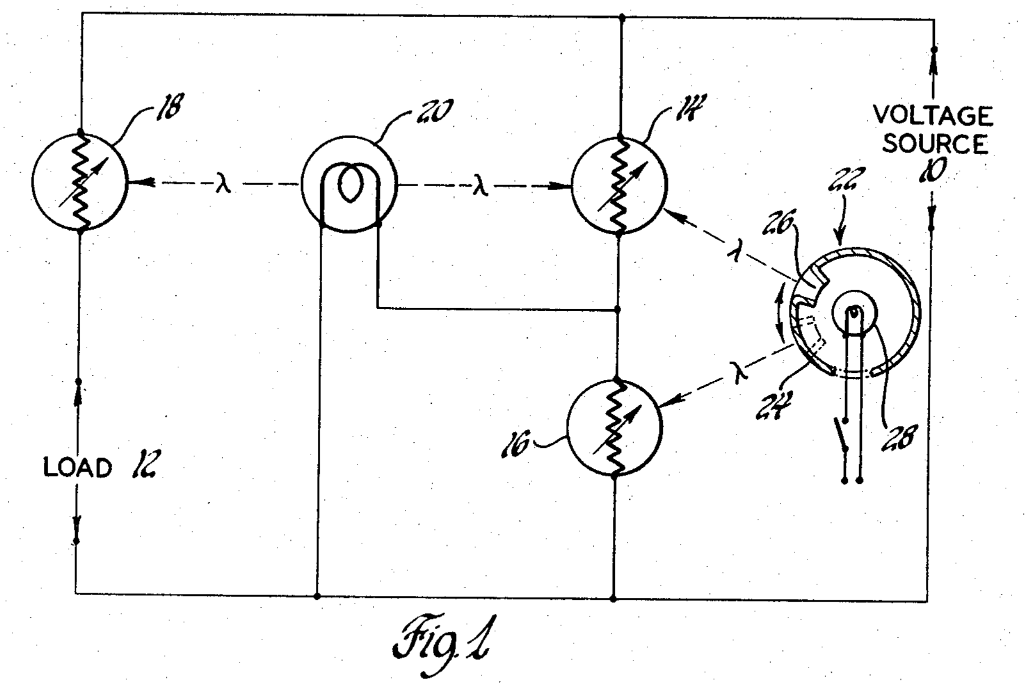
Figure 2:
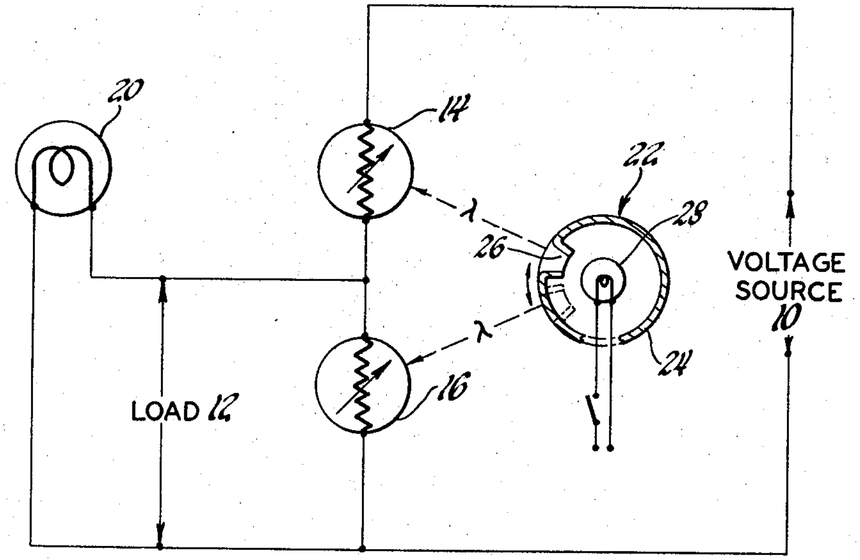

The foregoing and other objects and advantages of the invention will become apparent from the following description and from the accompanying drawings, in which:

FIGURE 1 is a schematic diagram of a circuit incorporating the principles of the invention; and FIGURE 2 is a schematic diagram of a modified circuit.

Referring now to the drawings and initially to FIGURE 1, the circuit illustrated is arranged so as to connect a voltage source, denoted generally at 10, to a load, shown generally at 12. This is accomplished by utilizing radiant energy responsive devices, such as input photocells 14 and 16, an output photocell 18, and a light source; e.g., an incandescent lamp 20. These input photocells 14 and 16 are controlled by a selectively operable radiant energy source of pulses, this being the function of a trigger pulse control viewed generally at 22. The photocells 14, 16 and 18 are preferably of the type that present a relatively low resistance when illuminated and should be capable of handling large amounts of power so that the circuit can have many diverse applications. Type LDR–25 photocells made by the Delco Radio Division of General Motors Corporation meet these requirements.

As illustrated in FIGURE 1, the input photocells 14 and 16 are connected in series with each other and across the source 10; whereas the output photocell 18 is in series with the load 12. The lamp 20 is connected across the input photocell 16 and located so as to illuminate when conductive both the input photocell 14 and the output photocell 18.

The control 22 may be of any character and may comprise a housing 24 that is maneuverable in any desired way. The housing 24 has an opening at 26 for confining the light energy from a lamp 28 enclosed therein to paths extending to either the input photocell 14 or the input photocell 16. Movement of the control 22 is such that a light trigger pulse of a certain duration can be selectively applied to either of the input photocells 14 or 16.

Considering now the operation, if it is first assumed that the control 22 supplies a trigger pulse to the input photocell 14, its resistance will be reduced and the voltage across the input photocell 16 increased sufficiently to turn on the lamp 20. The light energy from the lamp 20 is supplied to the input photocell 14 and will maintain it in its illuminated, low resistance state after the trigger pulse has been removed. Consequently, the lamp 20 will continue to be illuminated because of this optical feedback and will also supply light energy to the output photocell 18 so as to reduce its resistance. If, for exemplary purposes, the load 12 is considered resistive, the reduction in the potential across the output photocell 18 to a negligible amount will in effect cause the potential of the source to be applied to the load. As a result, the circuit is in a switch On state, with the source 10 connected to the load 12.

If it is desired to change the circuit to the switch Off state, the control 22 is maneuvered so as to apply a trigger pulse to the input photocell 16. This reduces the resistance of the input photocell 16 and accordingly the voltage drop thereacross so that by the proper selection of parameters the lamps 20 will be rendered nonconductive or turned off. The resistances of both the input photocell 14 and the output photocell 18 will increase in the absence of the light energy from the lamp 20 and each will now assume its nonilluminated or high resistance state. Consequently, substantially all the voltage of the source 10 will be dropped across the output photocell 18, and the load 12 will be disconnected from the voltage source 10.

In the FIGURE 2 circuit, the load 12 is connected across the input photocell 16 thereby enabling the output photocell 18 to be omitted. With the same sequence of events, i.e., a trigger pulse supplied by the control 22 to the input photocell 14, the lamp 20 will be turned on to maintain the input photocell 14 in its low resistance state so that the voltage of the source 10 is applied to the load 12. To place the FIGURE 2 circuit in a switch Off state, the trigger pulse from the control 22 is applied to the input photocell 16, thus reducing the resistance thereof and the voltage applied to the lamp 20. The lamp 20 will be rendered nonconductive and substantially all of the source voltage dropped across the input photocell 14 so that the load 12 will no longer be energized.

The various parameters necessary to achieve the foregoing operation will, as those versed in the art will readily understand, have to be varied to meet the requirements of each application of the circuit.

As will be appreciated, the lamp 20 in both the FIGURE 1 and FIGURE 2 circuits provides what can be called an optical feedback that causes the input photocell 14 to maintain its low resistance state once this state has been established by the appropriate trigger pulse. In effect then, the circuit has two stable states for On-Off switching and, therefore, is bistable. This enables the circuit to perform a memory function since the circuit members which of the photocells 14 or 16 was illuminated last.

The invention is to be limited only by the following claims.

What is claimed is:

1. A light actuated bistable circuit for energizing a load comprising, in combination, a source of potential, a pair of series connected On and Off light responsive cells connected across the source, an incandescent lamp connected across the Off light responsive cell and positioned opposite the On light responsive cell so as to provide optical feedback thereto when illuminated for maintaining the On light responsive cell illuminated, a load connected across the Off light responsive cell and also across the lamp and external control means selectively maneuverable to plural positions for operating the cells, the control means including a plural position source of light selective maneuverable to one position thereof for illuminating the On light responsive cell so that substantially all of the source potential is applied across the Off light responsive call causing the lamp to be illuminated to maintain the illuminated state of the On light responsive cell and also the load to be energized and to another position thereof for illuminating the Off light responsive cell so that substantially all of the source potential is applied across the On light responsive cell causing the lamp to be nonconductive and the load to be deenergized.

2. A light responsive bistable circuit for energizing a load comprising, in combination, a source of potential, the load being connected across the source, On and Off series connected light sensitive resistors both connected across the source, an output light sensitive resistor arranged in series with the load an incandescent lamp connected across the Off input light sensitive resistor and positioned relative to the On light sensitive resistor so as to provide optical feedback thereto when illuminated for maintaining the On light sensitive resistor illuminated and the output light sensitive resistor so as to provide illumination thereto, and external control means selectively maneuverable to plural position for operating the On and Off light sensitive resistors, the control means including a plural position source of light selectively maneuverable to one position thereof for illuminating the On light sensitive resistor so that a potential corresponding to source potential is applied across the Off light sensitive resistor causing the incandescent lamp to be illuminated both to maintain the illuminated state of the On light sensitive resistor and to cause the output light sensitive resistor to assume the illuminated state thereof so that a potential also corresponding to source potential is applied to the load and to another position thereof for illuminating the Off light sensitive resistor so that the potential across the Off light sensitive resistor is below the potential required to maintain the incandescent lamp illuminated and substantially all of the source potential is applied across the output light sensitive resistor thereby deenergizing the load.

References Cited by the Examiner

UNITED STATES PATENTS

| | | | |
|---|---|---|---|
| 2,100,934 | 11/1937 | Berges | 250—231 X |
| 2,985,763 | 5/1961 | Ress | 250—213 X |
| 3,066,223 | 11/1962 | Vize | 250—213 X |
| 3,087,068 | 4/1963 | Bowerman | 250—213 X |
| 3,163,764 | 12/1964 | Blank | 250—208 |

WALTER STOLWEIN, *Primary Examiner.*